I. S. HARRIS.
INTEREST COMPUTING DEVICE.
APPLICATION FILED NOV. 17, 1914.
1,287,300.
Patented Dec. 10, 1918.
2 SHEETS—SHEET 1.
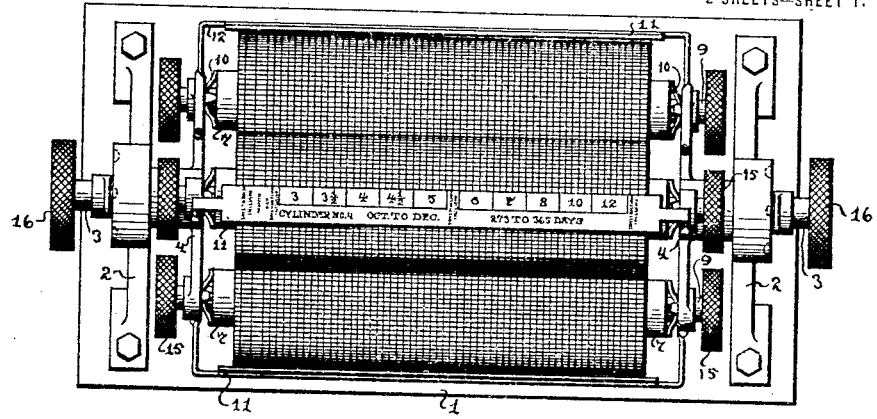
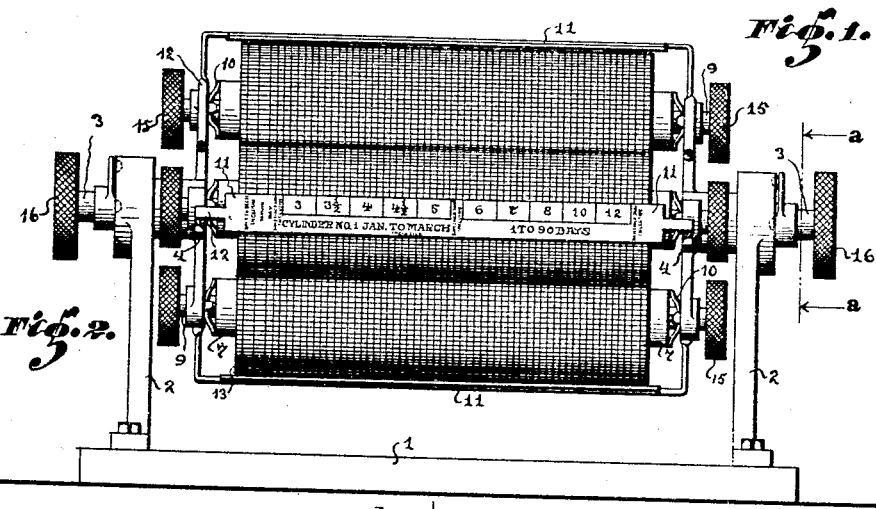
WITNESSES:
INVENTOR
I. S. Harris
ATTORNEY

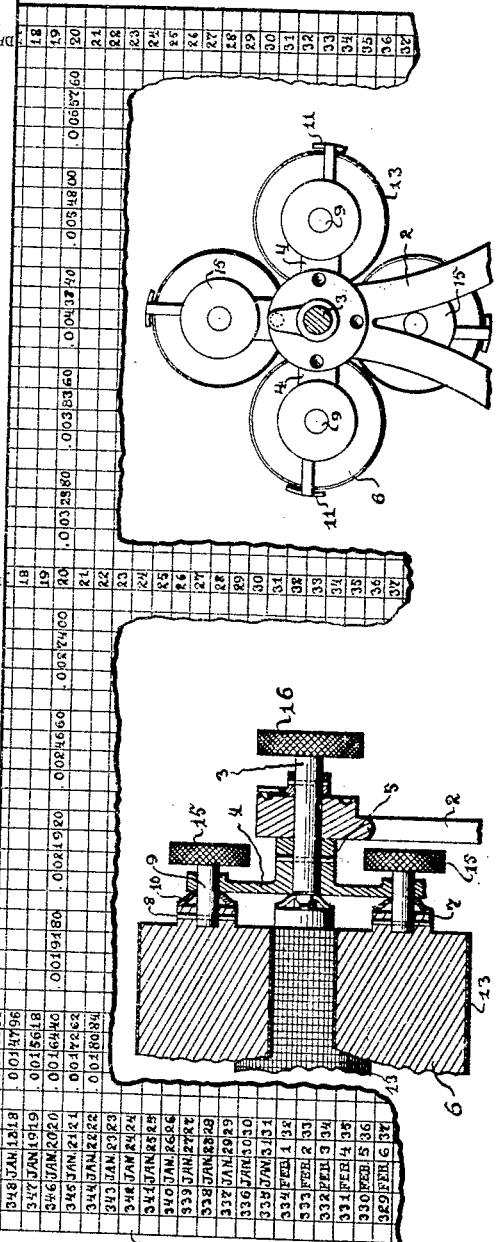

UNITED STATES PATENT OFFICE.

IRA S. HARRIS, OF DALLAS, TEXAS.

INTEREST-COMPUTING DEVICE.

1,287,300. Specification of Letters Patent. Patented Dec. 10, 1918.

Application filed November 17, 1914. Serial No. 872,519.

*To all whom it may concern:*

Be it known that I, IRA S. HARRIS, a citizen of the United States, residing at Dallas, in the county of Dallas and State of Texas, have invented certain new and useful Improvements in Interest-Computing Devices, of which the following is a specification.

My invention relates to a new and useful interest computing device, and its object is to provide a device which, when subjected to a very simple manipulation, will accurately indicate the amount of interest accruing upon one dollar at any ordinary rate of interest, and for any number of days.

The object of my invention more specifically stated, is to provide an interest computing device comprising one or more manually revoluble cylinders, each correlated with a parallel and adjacent index bar, a series of percentage rates being marked upon said bar, and a plurality of numbers being imprinted upon the cylinder forming both annular and rectilinear series, each number denoting the amount of interest accruing upon one dollar for a certain period of time at the rate of interest marked upon the index bar opposite the annular series containing said number, the cylinder being imprinted upon one of its end portions with a circular series of consecutive dates, the time required to produce the interest denoted by each number being that elapsing from the earliest of said dates to the date with which said number is in rectilinear series.

It is the object of my invention, finally, to provide a device of the character described, that will be strong, durable, simple and efficient, and comparatively easy to construct, and also one, the various parts of which will not be likely to get out of working order.

With these and various other objects in view, my invention has relation to certain novel features of the construction and operation, an example of which is described in the following specification and illustrated in the accompanying drawings, wherein:

Figure 1 is a plan view of my novel interest computing device.

Fig. 2 is a view of the same in front elevation.

Fig. 3 is an end view of the same.

Fig. 4 is a transverse vertical sectional view on *a—a* of Fig. 2.

Fig. 5 is an axial vertical section on *b—b* of Fig. 3, showing an end portion of my device.

Fig. 6 is a cross-section view of one of several similar cylinders which occur in my device, showing how a sheet of paper, (or of some other fabric) which is wrapped around each cylinder, is secured to the same.

Fig. 7 is a view showing how certain numbers and dates are arranged upon each of said sheets of paper, in a certain relation to other numbers carried by the index bar, which is correlated with each cylinder.

Referring now more particularly to the drawings, wherein like reference characters designate similar parts in all of the figures, the numeral 1 denotes the base of my device, and 2 designates a pair of brackets which rigidly surmount said base, one at each extremity of the same. In the upper extremities of said brackets, there are respectively journaled two alined shafts 3, each projecting a short distance in each direction from the correlated bracket. Contiguous with the inner face of each bracket 2, there is mounted fast upon the correlated shaft 3, a four-armed spider 4, the arms of which are ninety degrees apart. It is preferred to engage each spider in a rigid relation with the shaft carrying the same by means of a pin 5, transversely passed through the hub of the spider and the shaft. (See Fig. 5.) As will presently be made clear, the arms of the two spiders are constantly maintained in an opposite relation, a unity of rotation thus being established between the two shafts 3. Between the four pairs of opposite arms of the two spiders, there are revolubly mounted four similar cylinders 6, the axes of rotation of which are parallel to that of the shafts 3. The extremities of each cylinder are respectively formed with hubs 7, in each of which is rigidly engaged by a pin 8, a trunnion 9. The trunnions of each cylinder are journaled respectively in the extremities of the two arms between which the cylinder is mounted (see Fig. 5). Between each spider arm and the adjacent hub 7, there is interposed a bow spring 10, through which the correlated trunnion 9 is passed. The bow springs 10 exert a slight end-wise pressure upon the correlated cylinders 6, thus tending to maintain the same stationary in any position of angular adjustment.

Parallel and closely adjacent to each cylinder 6, there is mounted an index bar 11, the extremities of which are spaced outwardly from the spider arms between which the cylinder is mounted. The end portions of each index bar are reduced in width as illustrated at 12, and are bent at right angles toward the spider arms, supporting the correlated cylinder, being rigidly secured to said arms as is well shown in Figs. 1 and 2. Around each cylinder 6, there is wrapped a sheet of paper (or of some other fabric) 13, the longitudinal edges of which are overlapped and secured to the cylinder as indicated at 14 (see Fig. 6). The greater portion of the surface of each sheet 13 is filled with numbers carried to seven decimal places, which are arranged both in annular and rectilinear series, as is partially shown in Fig. 7. In said figure, there are shown two rectilinear series of said numbers and a portion of one annular series, it being considered unnecessary to show the entire surface of the sheet filled with numbers, as is actually the case. Each of said numbers denotes the amount of interest accruing on one dollar for a certain number of days at a certain rate of interest. The rate of interest taken to produce each number is marked upon the index bar opposite the annular series in which the said number is contained. From Fig. 7, it is seen that the index bar carries the following series of numbers indicating interest rates, each being opposite an annular series of the decimal numbers: 3, 3½, 4, 4½, 5, 6, 7, 8, 10, and 12. This series includes all of the commonly used rates of interest, and will be carried on each index bar. At the left extremity of each cylinder, the correlated sheet 13 is imprinted with an annular series of consecutive dates, preferably covering a period of three months. On the sheet shown in Fig. 7, the series of the dates extends from Jan. 1 to March 31, inclusive, but since the sheet in question is not shown complete, the last date shown is Feb. 6. The index bar correlated with the cylinder carrying said sheet, is marked "Cylinder No. 1, January to April." Similarly the series of the dates carried by each of the other sheets 13 cover the three other quarters of the year, and the correlated index bars are correspondingly marked.

Just to the right of each annular series of dates, there is imprinted on each sheet an annular series of consecutive numbers, which respectively denote the numbers of days which will have enlarged between the dates adjacent to said numbers and January 1. The portion of one such series shown in Fig. 7 extends from 1 to 37.

Just to the left of each annular series of dates, another annular series of numbers is carried by each sheet, each denoting the number of days remaining in a year at the date to which it is adjacent. The portion of one such series shown in Fig. 7 extends from 365 to 329.

The annular series of numbers which indicates the days elapsing since January 1 occurs on each sheet 13 three times, once as already described, again at the right extremity of the cylinder and a third time substantially midway between the other two occurrences. Opposite each occurrence of this series, there is marked upon the correlated index bar "Days since Jan. 1, inclusive." Opposite the series denoting the numbers of days remaining in a year there is marked upon each index bar "Days to Dec. 31." The words "Month" and "Day" also appear upon each index bar, respectively opposite the annular series of names of months and of numbers indicating days of months. The index bars will furthermore be respectively marked as follows: "1 to 90 days, 91 to 181, 182 to 273, 274 to 365," and taken as described, will be correlated with the sheets 13, containing dates for the first, second and third and fourth quarters.

Upon the free extremity of each trunnion 9, there is mounted fast a milled head 15, to facilitate the annually produced rotation of the correlated cylinder. Similarly, there is rigidly mounted upon the outer end of each shaft 3 a milled head 16, which facilitates the manual application of rotation to frame comprised by the spiders 4, the cylinders, and the index bars, the cylinders not being subjected to rotation about their respective axes in this case.

The operation of my invention, which has been above fully described, may be best explained by considering the solution of certain problems by means of the device. Suppose it be desired to compute the amount of interest accruing on a certain sum of money from Feb. 18 until November 7, at six per cent. The frame supporting the four cylinders will first be rotated to bring cylinder 1 to a position in which it may be readily inspected. Said cylinder will now be subjected to sufficient rotation to permit one to ascertain the number adjacent to the date Feb. 18, indicating the number of days intervening between said date and January 1. This number (not shown) would be 49. The frame of my device will now be again rotated to bring cylinder number 4 uppermost. Said cylinder is now subjected to a sufficient rotation to permit the number just to the right of the date Nov. 7 to be read. This number, which indicates the number of days elapsed since Jan. 1 would be 311. If 49 is now subtracted from 311, we get 262, the number of days during which interest must be figured. It is now necessary to locate the number 262 in one of the four annular series of numbers, each of which indicates the number of days intervening between the adjacent date and Jan. 1. It will be found that the number occurs on cylinder number 3, which cylinder must now be subjected to rotation until the number in question lies just beyond the correlated index bar. Opposite the number 6 on said index bar, and in rectilinear series with the number 262, one may now read the interest accruing on one dollar for 262 days at 6 per cent., this number (not shown) being .4306756. The interest for the same length of time, and at the same rate, on any amount of money may now be quickly figured by multiplying .4306756 by the amount in question.

If the two dates between which interest accrues lie in different years, the annular series of number just to the left of the date series come into use. Thus for example, if it is desired to find the number of days intervening between Jan. 22 of one year and Jan. 4 of the following year, (see Fig. 7) one may find upon cylinder number 1 just to the right of the date "Jan. 22," the number 344, indicating the remaining days in that year, and it remains only to add to the number thus found, the number 4, denoting the days of the ensuing year during which interest accrues.

The invention is presented as including all such modifications and changes as properly come within the scope of the following claim.

What I claim is:

In a device of the character described, a series of cylinders supported to project radially from a common axis, the surface of each cylinder provided with one division of the scales and indexes entering as factors in the complete computations desired, a means for detachably securing said scales and indexes to each cylinder, two spiders the arms of which form the bearings wherein each cylinder may be independently revolved, a means for rotating the spiders synchronously, and an index bar for each cylinder, said bars connected to and supported by the free ends of the spider arms above the outer surface of each cylinder and each index bar serving to indicate the divisions of the scales carried by the cylinder revolving under said index bar.

In testimony whereof I have signed my name to this specification in the presence of two subscribing witnesses.

IRA S. HARRIS.

Witnesses:
R. E. C. BRUCKNER,
J. KIRK.

Copies of this patent may be obtained for five cents each, by addressing the "Commissioner of Patents, Washington, D. C."